United States Patent
Bensmann et al.

(10) Patent No.: US 11,453,477 B2
(45) Date of Patent: Sep. 27, 2022

(54) WING LEADING EDGE DEVICE AND A WING HAVING SUCH A WING LEADING EDGE DEVICE

(71) Applicant: Airbus Operations GmbH, Hamburg (DE)

(72) Inventors: Stefan Bensmann, Hamburg (DE); Marcus Erban, Hamburg (DE); Martin Fees, Hamburg (DE)

(73) Assignee: Airbus Operations GmbH

( * ) Notice: Subject to any disclaimer, the term of this patent is extended or adjusted under 35 U.S.C. 154(b) by 217 days.

(21) Appl. No.: 16/796,025

(22) Filed: Feb. 20, 2020

(65) Prior Publication Data
US 2020/0277039 A1    Sep. 3, 2020

(30) Foreign Application Priority Data
Feb. 28, 2019   (DE) ...................... 10 2019 105 157.6

(51) Int. Cl.
  *B64C 9/22* (2006.01)
  *B64C 3/18* (2006.01)
  *B64C 3/28* (2006.01)

(52) U.S. Cl.
  CPC ............... *B64C 9/22* (2013.01); *B64C 3/185* (2013.01); *B64C 3/28* (2013.01)

(58) Field of Classification Search
  CPC ............... B64C 9/22; B64C 9/24; B64C 9/26
  See application file for complete search history.

(56) References Cited

U.S. PATENT DOCUMENTS

| 2,541,565 A | 2/1951 | Ziegler |
| 4,752,049 A * | 6/1988 | Cole ............ B64D 15/04 244/134 B |
| 5,975,465 A | 11/1999 | Donal et al. |
| 2003/0136815 A1 | 7/2003 | Debaisieux et al. |

FOREIGN PATENT DOCUMENTS

| EP | 1327489 A1 | 7/2003 |
| FR | 2739832 A1 | 4/1997 |
| GB | 552322 A | 4/1943 |
| GB | 2429441 A | 2/2007 |
| WO | 2006010699 A1 | 2/2006 |
| WO | 2008082437 A2 | 7/2008 |

OTHER PUBLICATIONS

Extended European Search Report with Written Opinion for Application No. 20159994.1 dated Jul. 23, 2020. 7 pages.

* cited by examiner

*Primary Examiner* — Timothy D Collins
*Assistant Examiner* — Eric Acosta
(74) *Attorney, Agent, or Firm* — Lerner, David, Littenberg, Krumholz & Mentlik, LLP

(57) ABSTRACT

A wing leading edge device includes a flow body having a front side, which is delimited by a first spanwise edge and a second spanwise edge, a back side, which is delimited by the first spanwise edge and the second spanwise edge, a front skin arranged on the front side, a back skin arranged on the back side, and at least one stiffening arrangement between the front skin and the back skin in the region of the first spanwise edge, wherein the front skin extends continuously and free from interruptions between the first spanwise edge and the second spanwise edge and covers the at least one stiffening arrangement.

9 Claims, 5 Drawing Sheets

WING LEADING EDGE DEVICE AND A WING HAVING SUCH A WING LEADING EDGE DEVICE

FIELD OF THE INVENTION

The invention relates to a flow body of an aircraft, in particular for a wing leading edge device, a wing having a fixed wing body and a wing leading edge device, as well as an aircraft having at least one such flow body.

BACKGROUND OF THE INVENTION

For increasing the lift coefficient of a wing of a commercial aircraft, high lift systems are known. These may include trailing edge flaps, and leading-edge devices. During takeoff and landing, they are usually activated, i.e. moved from a retracted into an extended position.

Leading-edge slats usually comprise a front skin, a back skin and mechanical interfaces for coupling with a slat track. It is common to use a separate trailing edge at the end of a slat, which may be built from a metal honeycomb with top and bottom covers and an extrusion profile for the tip. For hybrid slats the back skin and the trailing edge are a monolithic part, but need to be attached by fasteners to the front skin.

BRIEF SUMMARY OF THE INVENTION

Common designs result in a design gap between front skin and trailing edge of a slat. Natural laminar flow investigations show that the flow may separate at the gap, even if it is sealed, and become turbulent.

An aspect of the invention proposes a flow body and in particular for a wing leading edge device that comprises a simple design, but provides an as smooth as possible flow.

A flow body for an aircraft, in particular for a wing leading edge device is proposed, the flow body having a front side, which is delimited by a first spanwise edge and a second spanwise edge, a back side, which is delimited by the first spanwise edge and the second spanwise edge, a front skin arranged on the front side, a back skin arranged on the back side, and at least one stiffening arrangement between the front skin and the back skin in the region of the first spanwise edge, wherein the front skin extends continuously and free from interruptions between the first spanwise edge and the second spanwise edge and covers the at least one stiffening arrangement.

The flow body may be arranged along the spanwise direction at least in a retracted state. Accordingly, the flow body may comprise an elongate shape that extends along the spanwise direction and comprises a certain profile contour. The profile contour is mainly determined by the desired aerodynamic characteristics. It is preferred that the flow body is sufficiently stiff to serve for the intended purpose, since it is directly exposed to a strong air flow during flight conditions.

The front skin is arranged on the front side and comprises a leading edge of the flow body. In the example of the wing leading edge device, this is the case at least in an extended state of the wing leading edge device. Thus, the front skin is mainly designed according to the aerodynamic requirements. It comprises a first spanwise edge and a second spanwise edge, which both run in a spanwise direction and delimit both the front side and the front skin. The front skin extends between these edges preferably in a concave shape at least in an extended position.

The flow body may be designed according to a variety of different concepts. For example, the flow body may be a leading-edge slat, which comprises a substantially fixed shape. The slat may be coupled with a drive arrangement comprising a slat track, such that the slat is substantially moved in a forward direction between a retracted state, in which the slat is directly forward a fixed leading edge, and several extended positions. The motion path of the slat may also comprise a slight downward and rotary component. The flow body may also be a Krueger flap, which is moved from a retracted position at a bottom side of a fixed leading edge to a position forward of the fixed leading edge, under creation of a gap. For the extension motion, a rotation of substantially more than 90° is required. It may be possible to let such a flap deform from a substantially flat shape to a more curved shape during the extension. Still further, the flow body may constitute a droop or drooping nose, which comprises a substantially fixed position on the fixed leading edge of the wing but rotates around a substantially spanwise axis.

In the following, the first spanwise edge and the second spanwise edge may be arbitrarily chosen. However, it may be preferred if the first spanwise edge is a trailing edge of the flow body, which may be arranged above a fixed leading edge of the wing in the retracted position. The second spanwise edge may thus be a lower spanwise edge of the flow body.

The at least one stiffening arrangement is provided at least in the region of the first spanwise edge and serves for improving the structural stability of the flow body at least in the region of the first spanwise edge. Thus, the at least one stiffening arrangement particularly stabilizes the trailing edge of the flow body. As indicated further below, the at least one stiffening arrangement may be realized by a variety of different techniques.

An aspect of the invention relates to providing a completely closed surface on the front side by providing a continuous front skin. Any gaps can be prevented, such that also slight turbulences can be eliminated. The differently realized embodiments of the at least one stiffening arrangement support the provision of a continuous front skin.

Besides wing leading edge devices like slats or droop nose devices, other kinds of flow bodies may benefit from the invention. These may include many different flow bodies having a trailing edge, such as flaps, ailerons, flaperons, spoilers horizontal and vertical tail planes, rudders and many others.

In an advantageous embodiment, the at least one stiffening arrangement extends between the front skin and the back skin in the region of the first spanwise edge. Thus, a hollow space inside the flow body in the region of the first spanwise edge is fitted with the stiffening arrangement or stiffening elements. An additional trailing edge part, which is to be attached to the skins, is not required in this design.

Advantageously, the at least one stiffening arrangement comprises at least one spar. The spar may have a spanwise extension with a web and flanges on opposed sides of the web for attachment to the skins. It may be arranged substantially perpendicular to one of the front skin and the back skin. Preferably, the spar is arranged perpendicular to the front skin. However, it may also be arranged parallel to a vertical axis of the aircraft, to which the flow body is coupled.

Still further, the at least one stiffening arrangement may comprise a tip profile body attached to the front skin neighboring the first spanwise edge at side of the front skin that faces the back skin for stiffening the flow body in the region of the first spanwise edge. The tip profile body may comprise a rigid, elongated body that extends in a spanwise direction. However, the tip profile body may also have a hollow shape with a closed circumferential contour or an open contour. By providing a dedicated tip profile body, the position and shape of the flow body in the section of the first spanwise edge can be maintained more easily. It may be possible that the tip profile body directly adjoins the front skin and follows on in a rearward direction. Thus, a slight step or gap between the first spanwise edge and the tip profile body may be present, which, however, is as far at the trailing edge as possible and thus does not influence the aerodynamic behavior of the flow body.

In another advantageous embodiment, the back skin is joggled in a spanwise section adjacent to the first spanwise edge. Particularly in this example, also a spar may be arranged between the front skin and the back skin. By providing a joggled back skin an improved connection may be realized in the region of the first spanwise edge. Further, a thickness step for a more flexible tip may be realized. For realizing a flush transition between the flow body and a fixed leading edge downstream of the flow body in extended positions, the first spanwise edge and thus the tip profile need to be thin at the end. Hence, if the front skin is also arranged at the tip, i.e. the first spanwise edge, the edge may also be chamfered.

Further, the at least one stiffening arrangement comprises a rib that extends between the front skin and the back skin. The rib may extend over a section of the hollow space between the front skin and the back skin. It may thus only partially extend in the profile of the hollow space. However, it may also extend through the whole profile of the hollow space. By providing the rib, complex autoclave cycles for bonding stiffening elements may be avoided. The rib and the skins may be connected by rivets. Also, a tip profile, which is mentioned further above, may be riveted to the skins. By providing a multi rib trailing edge design dedicated routes for hot air for anti- and/or de-icing may be created.

The at least one stiffening arrangement may comprise a plurality of spanwise stiffening profile bodies. The at least one stiffening arrangement may thus also provide a stiffening function in a spanwise direction. The flow body may comprise a substantial extension along the spanwise direction. Thus, providing stiffening elements that run along the spanwise direction, leads to an improved structural stability of the flow body.

Still further, the spanwise stiffening profile bodies may be a part of a corrugated material sheet. The corrugated material sheet may be manufactured by a relatively simple manufacturing process. The corrugated sheet may be attached to the skins by riveting or gluing. It may be manufactured from a material that harmonizes with the material of the top and back skin, such as a composite component or a metallic material.

In another embodiment, the at least one stiffening arrangement may comprise a honeycomb core that extends between the front skin and the back skin. The honeycomb core is excellently feasible of providing a stiffening function. The honeycomb core may be glued to the skins or it may be directly bonded. Additional joggles or steps are not required.

According to another embodiment, the at least one stiffening arrangement comprises a stiffening profile body arranged at the first spanwise edge, wherein the back skin ends on or at the stiffening profile body in a distance to the first spanwise edge. As mentioned above, the stiffening profile body may be arranged at the first spanwise edge and may provide a simple and efficient way for improving the structural stability directly at the first spanwise edge.

In this context it is further indicated that using a tip profile body at a trailing edge is applicable in most cases described above. However, if such a tip profile body is not desired, also a chamfered front skin may be used. Hence, in the embodiments presented above and the illustrations provided further below, instead of using a tip profile body also a chamfered front skin may be provided. For example, in these cases the back skin may end slightly more forward than the front skin and may be attached to the front skin at the end of the back skin. Consequently, the front skin may constitute a kind of tip. To improve such a front skin tip, it may be chamfered, as mentioned above and further below.

As already indicated above it may be preferred that the device is a leading-edge slat, wherein the first spanwise edge is a trailing edge of the slat.

The invention also relates to a wing having a fixed wing body and a wing leading edge device having a flow body according to the above description.

Finally, the invention also relates to an aircraft, having at least one such wing.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
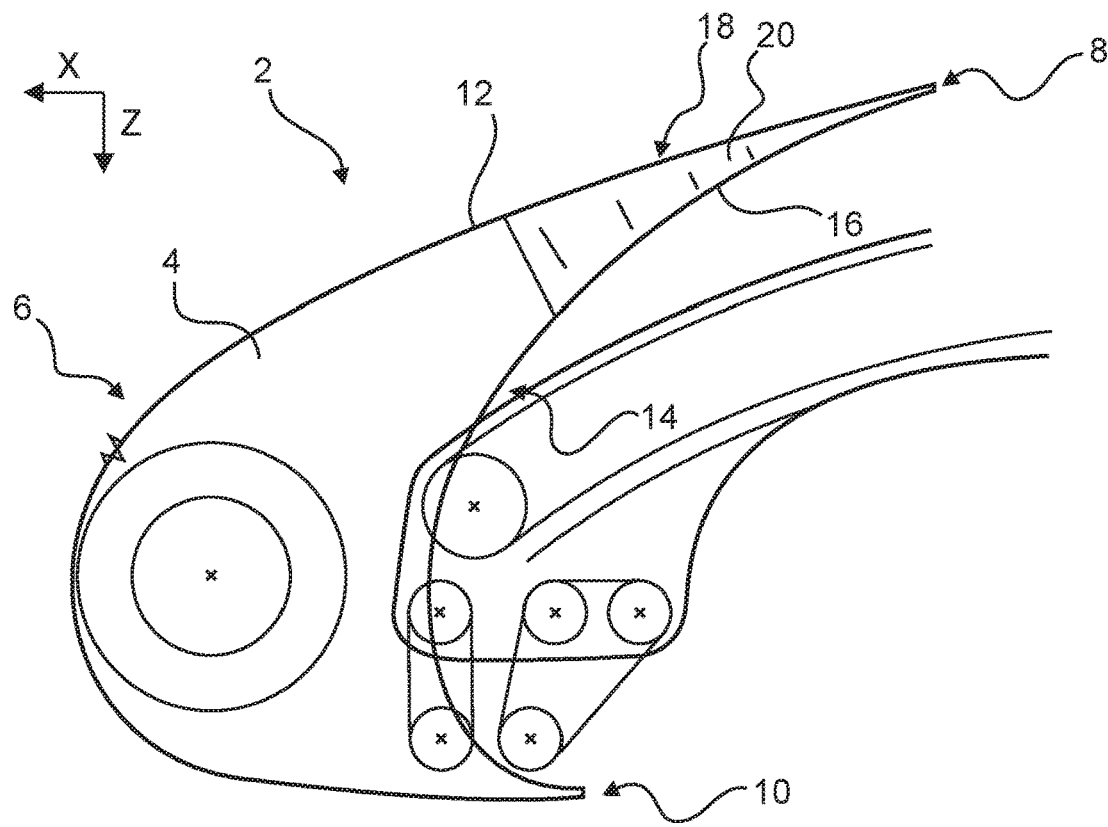
FIGS. 1 to 8 show different exemplary embodiments of wing leading edge devices having a flow body.

FIG. 1 shows a first exemplary embodiment of a wing leading edge device 2 having a flow body 4 in the form of a leading-edge slat. The flow body 4 comprises a front side 6, which is delimited by a first spanwise edge 8 and a second spanwise edge 10. The flow body 4 extends in a spanwise direction and may exemplary be arranged at a fixed leading edge of a wing (not shown). In this example, the first spanwise edge 8 is a trailing edge, which may be arranged above the fixed leading edge of the wing. It may also be referred as upper delimiting edge. The second spanwise edge 10 in this case is a lower spanwise edge and may be arranged at the underside of the fixed leading edge of the wing at least in a retracted position of the wing leading edge device 2. In the exemplary embodiments further below the same reference numerals 8 and 10 are used for the first and second spanwise edges, too.

In this exemplary embodiment, the front side 6 comprises a top skin 12, which continuously extends from the first spanwise edge 8 to the second spanwise edge 10. This means, that there is no gap or interruption in the top skin 12. The top skin 12 is exposed to an airflow during flight conditions and thus does not lead to distinct turbulences due to gaps or steps on the front side 6.

Facing the fixed leading edge of the wing in the retracted position, the flow body 4 comprises a backside 14 having a back skin 16. While this is not necessary, in this example the back skin 16 is attached to the flow body 4 and at least partially extends from the first spanwise edge 8 to the second spanwise edge 10. For installations, cut-outs, recesses and the like may be provided.

In a region around the first spanwise edge 8, a stiffening arrangement 18 is located. In this example, it comprises a honeycomb core 20, which may be made from a metal material. The honeycomb core 20 is exemplarily bonded to the inner sides of both skins 12 and 16. This may be conducted by gluing or a curing process, if the skins 12 and 16 being made from a composite material. The individual cells of the honeycomb core 20 may extend along a spanwise direction. As an alternative, they may also extend substantially perpendicular to a tangent line on the front skin 12.

Figure 2:
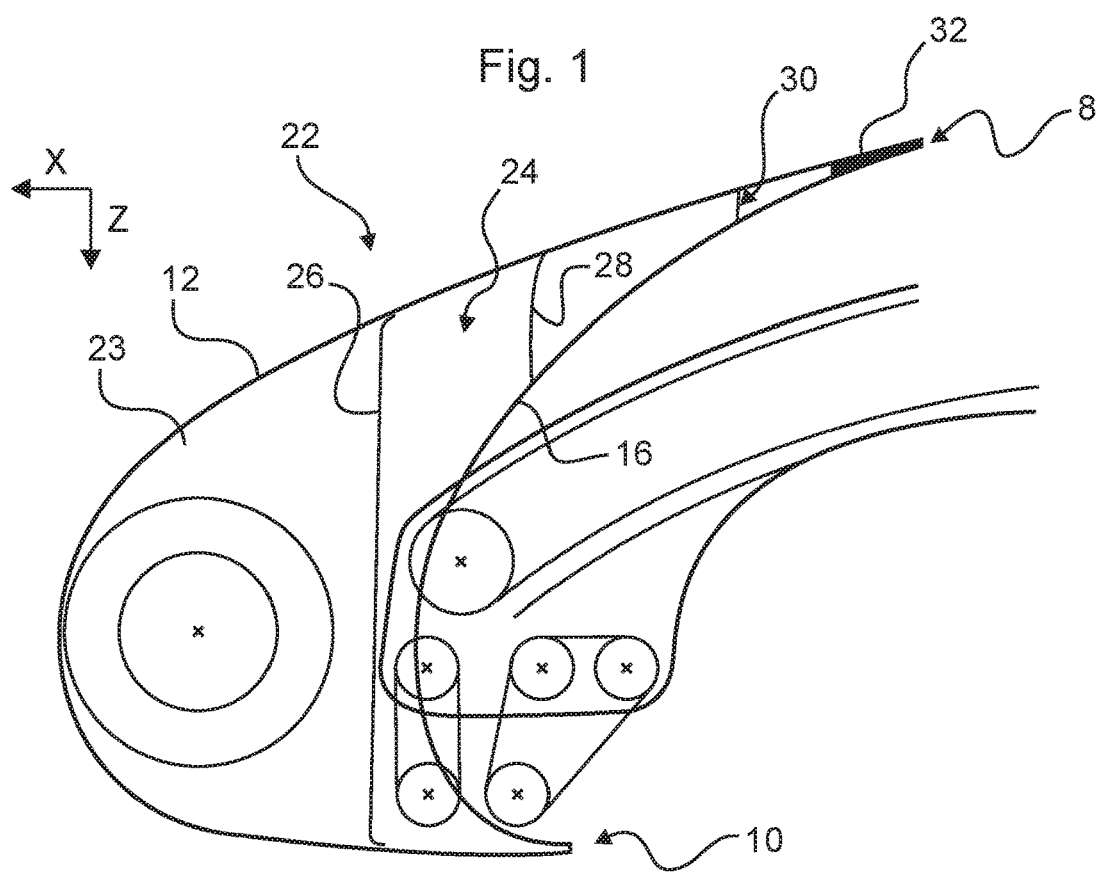

In FIG. 2 a very similar wing leading-edge device 22 having a flow body 23 is shown. Here, a stiffening arrangement 24 is depicted, which comprises a plurality of spars 26, 28 and 30, which are all substantially arranged parallel to a that axis of the outcrops, to which the wing leading-edge device 22 is attached. Also, the spars 26, 28 and 30 are distance to each other along the x direction, i.e. along the chordwise direction, wherein the distance between consecutive spars may be identical.

Additionally, a tip profile body 32 is provided, which is arranged directly forward the first spanwise edge 8. The tip profile body 32 may exemplarily be a rigid body having a tapered profile and extending in a spanwise direction. It serves for stiffening the spanwise edge 8 and may be glued or riveted to the skins 12 and 16. As another modified embodiment, the tip profile body 32 may be designed to be attached to a rear side of a rearmost spar.

Figure 3:
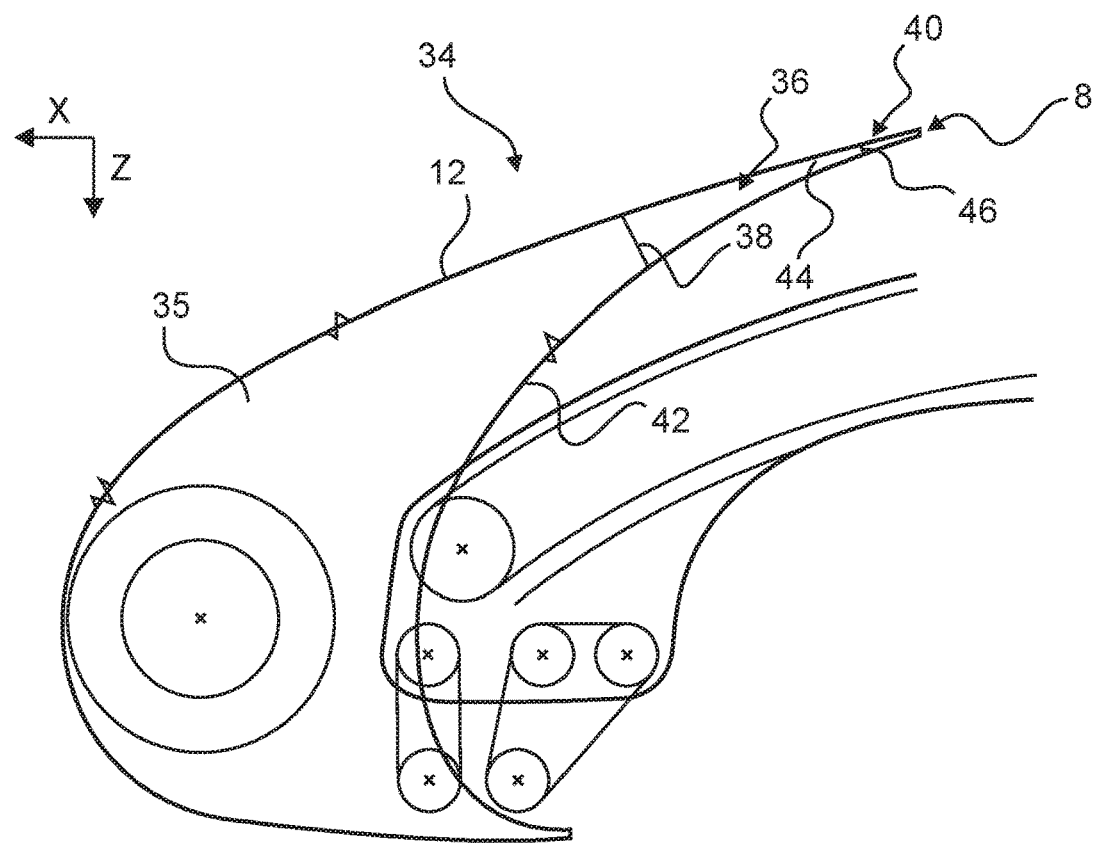

FIG. 3 illustrates a still further wing leading edge device 34 having a flow body 35. Here, a stiffening arrangement 36 is provided, which comprises a spar 38. Additionally, the flow body 35 has a flexible tip 40 at the spanwise edge 8, which is created using a joggled back skin 42. Here, a first step 44 of the back skin 42 is provided in a clear distance to the first spanwise edge 8, to which the back skin 42 may be chamfered. However, it may also be cut further away. An end 46 of the back skin 42 is arranged in a distance to the first spanwise edge 8 and between the first spanwise edge 8 and the first step 44. Hence, the tip 40 comprises a clearly higher flexibility compared to the exemplary embodiments of FIGS. 1 and 2.

The spar 38 may be arranged perpendicularly to the top skin 12 and may be riveted to both skins 12 and 42. However, other arrangements are possible. For example, the spar 38 may be arranged to be parallel to the z axis.

Figure 4:
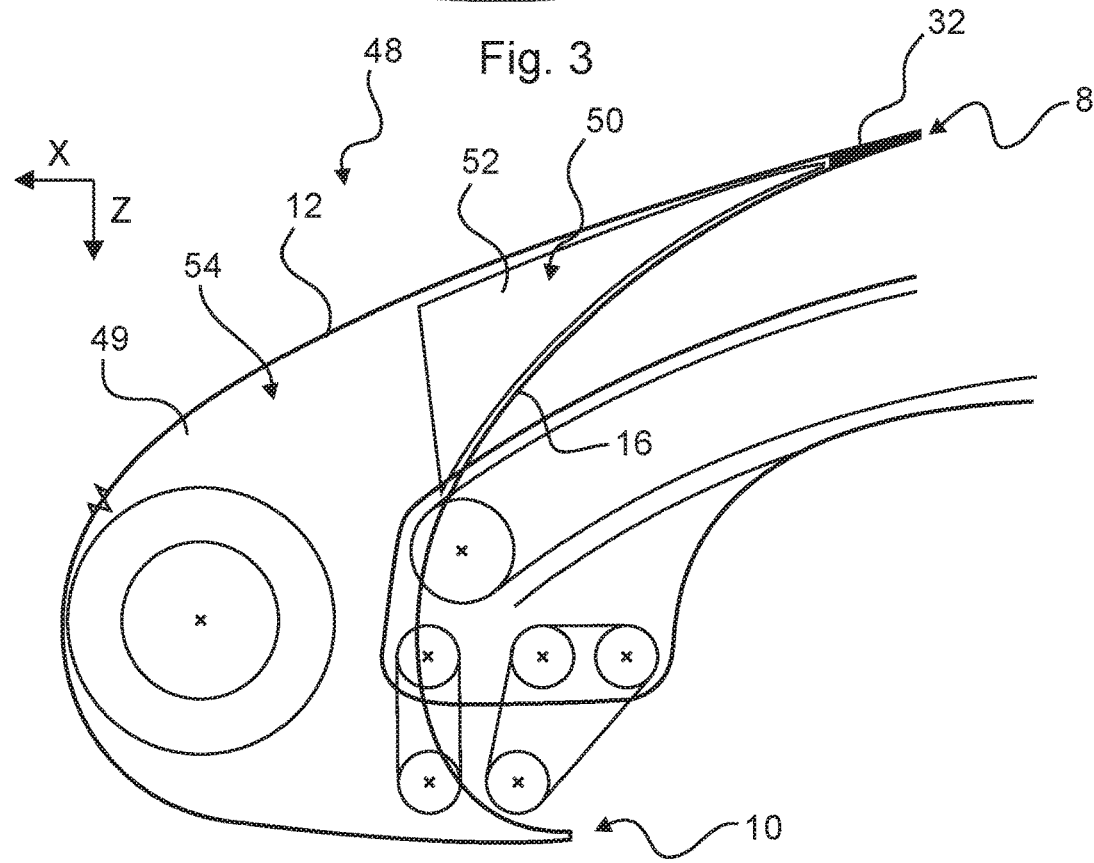

FIG. 4 shows a very advantageous embodiment of a wing leading-edge device 48 with a flow body 49. Here, a tip profile body 32 as shown in FIG. 2 is provided in the vicinity of the first spanwise edge 8. As a stiffening arrangement 50, a sheet metal rib 52 is arranged in a hollow space 54 of the flow body 49 and fills it partially. Several of these sheet metal ribs 52 may be provided and can be attached to the skins 12 and 16 by rivets. Sheet metal ribs 52 are simple to manufacture and to attach and allow to avoid complex autoclave cycles. According to a state of the art design, a flow body may comprise a trailing edge having an integrated honeycomb. Such a part is usually bonded in an autoclave under high pressure and temperature. Such a process is cumbersome and not cost-efficient. A trailing edge with a plurality of ribs in the form of a sheet metal rib 52 may be riveted, which avoids the autoclave process and may be less costly.

Figure 5:
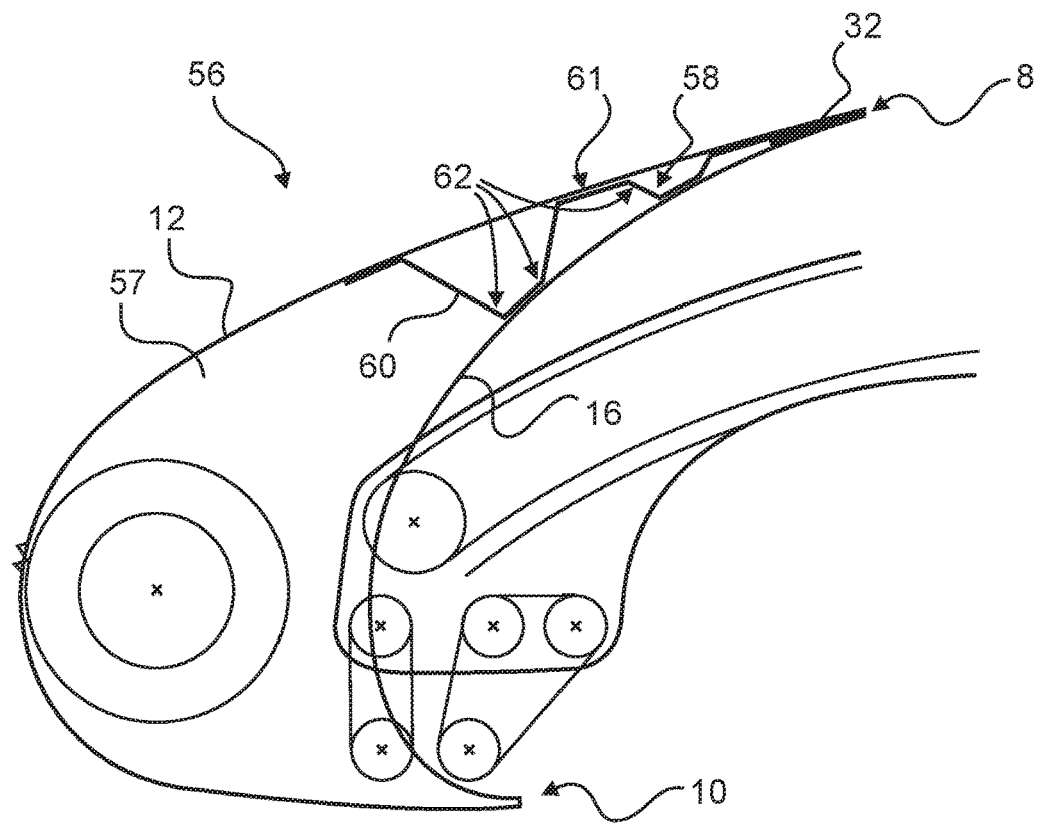

FIG. 5 shows a wing leading-edge device 56 having a flow body 57 with a stiffening arrangement 58 having several spanwise stiffening profile bodies 61. These are created by a corrugated sheet 60 with a plurality of folds 62, which all run along the spanwise direction. In addition, a tip profile body 32 is arranged in the vicinity of the first spanwise edge 8 similar to the exemplary embodiment shown in FIG. 2. The corrugated sheet 60 may be attached to the skins 12 and 16 by riveting. In doing so, a very stiff flow body 57 is created. Instead of simple folds 62, also a chess pattern is possible. Here, spanwise and chordwise folds or profile extensions may be provided in combination.

Figure 6:
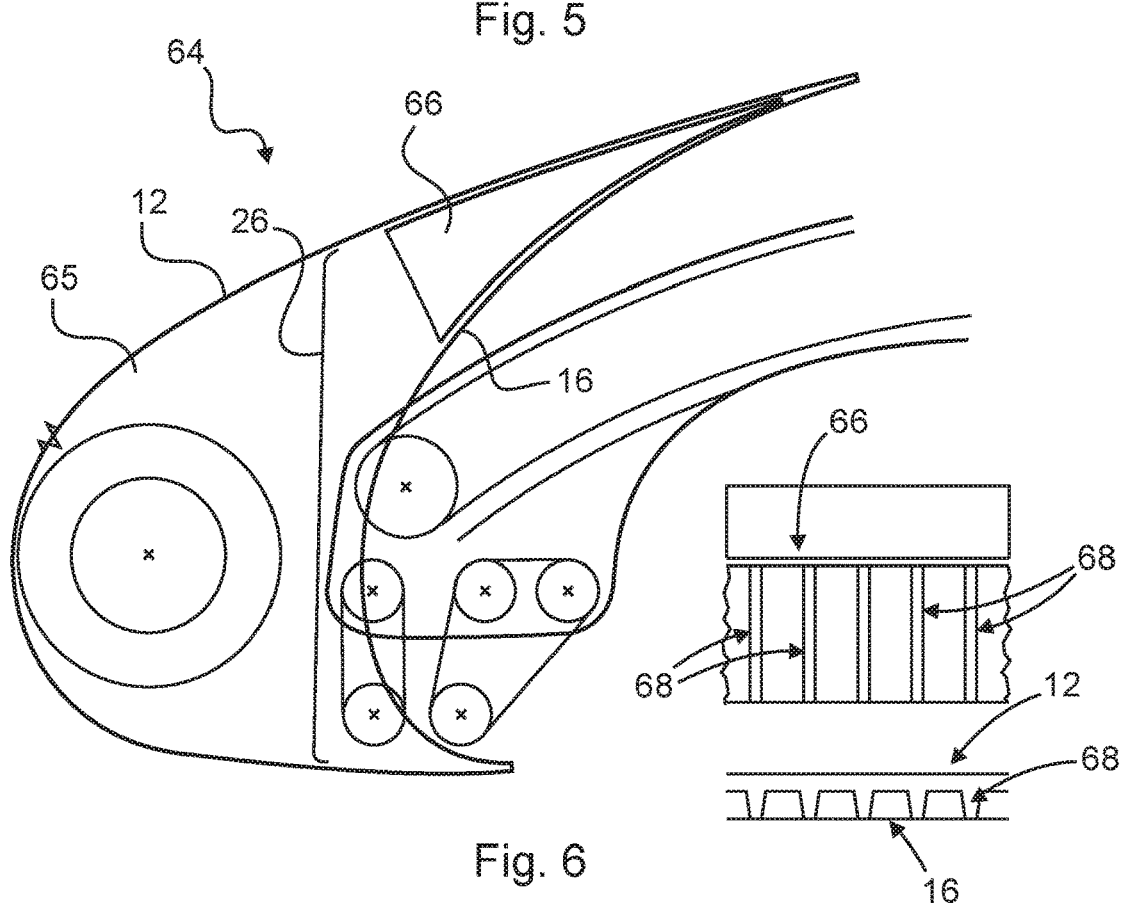

In FIG. 6, a wing leading edge device 64 is shown. Here, a corrugated sheet 66 is arranged in a flow body 65 of a wing leading edge device 64. Here, folds 68 are arranged, that extends in a chordwise direction. The back skin 16 may be continuous, but it may also be interrupted in the region of the corrugated sheet 66.

Figure 7:
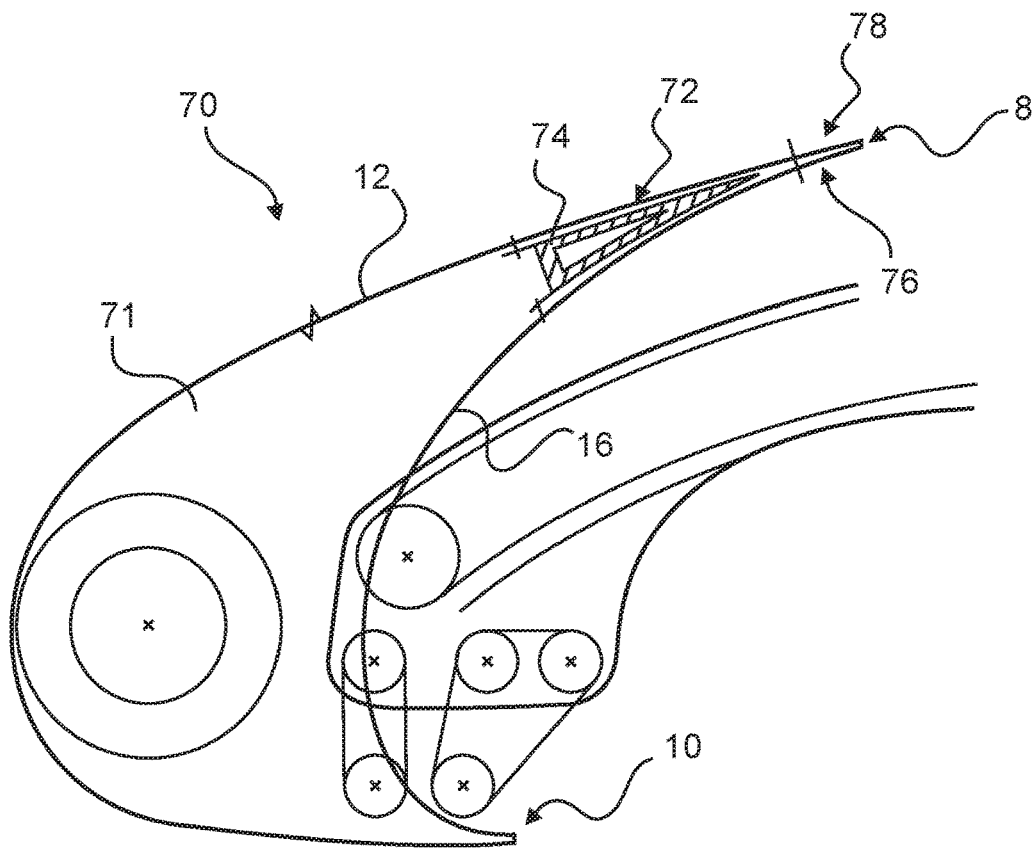

FIG. 7 shows a still further embodiment in the form of a wing leading edge device 70 with a flow body, which may comprise a stiffening arrangement 72 having a tip profile body 74 that is exemplarily hollow and that extends along the spanwise direction. The tip profile body 74 may also be solid or partially solid and partially hollow. In the region of the first spanwise edge 8, a joggled back skin 76 may be provided to increase the flexibility of a tip 78 of the flow body 71.

Figure 8:
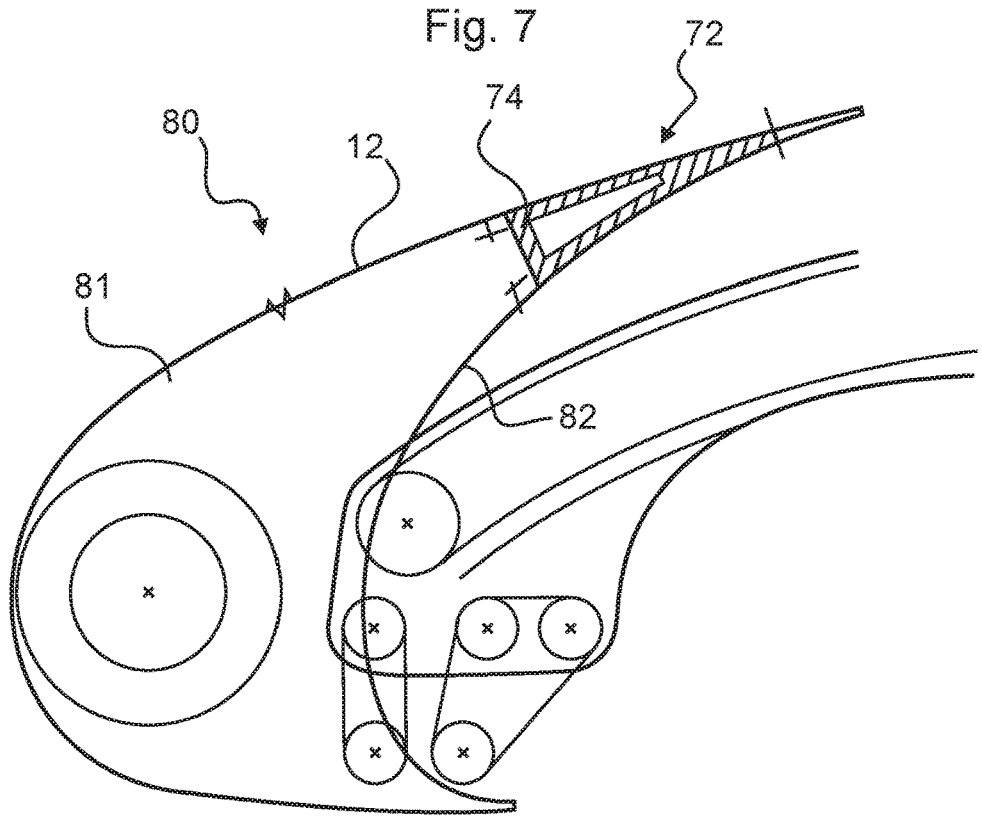

In FIG. 8 this concept is modified in a flow body 81 of a wing leading edge device 80 by increasing the size of the tip profile body 74, wherein a back skin 82 is interrupted along the tip profile body 74.

Figure 9:
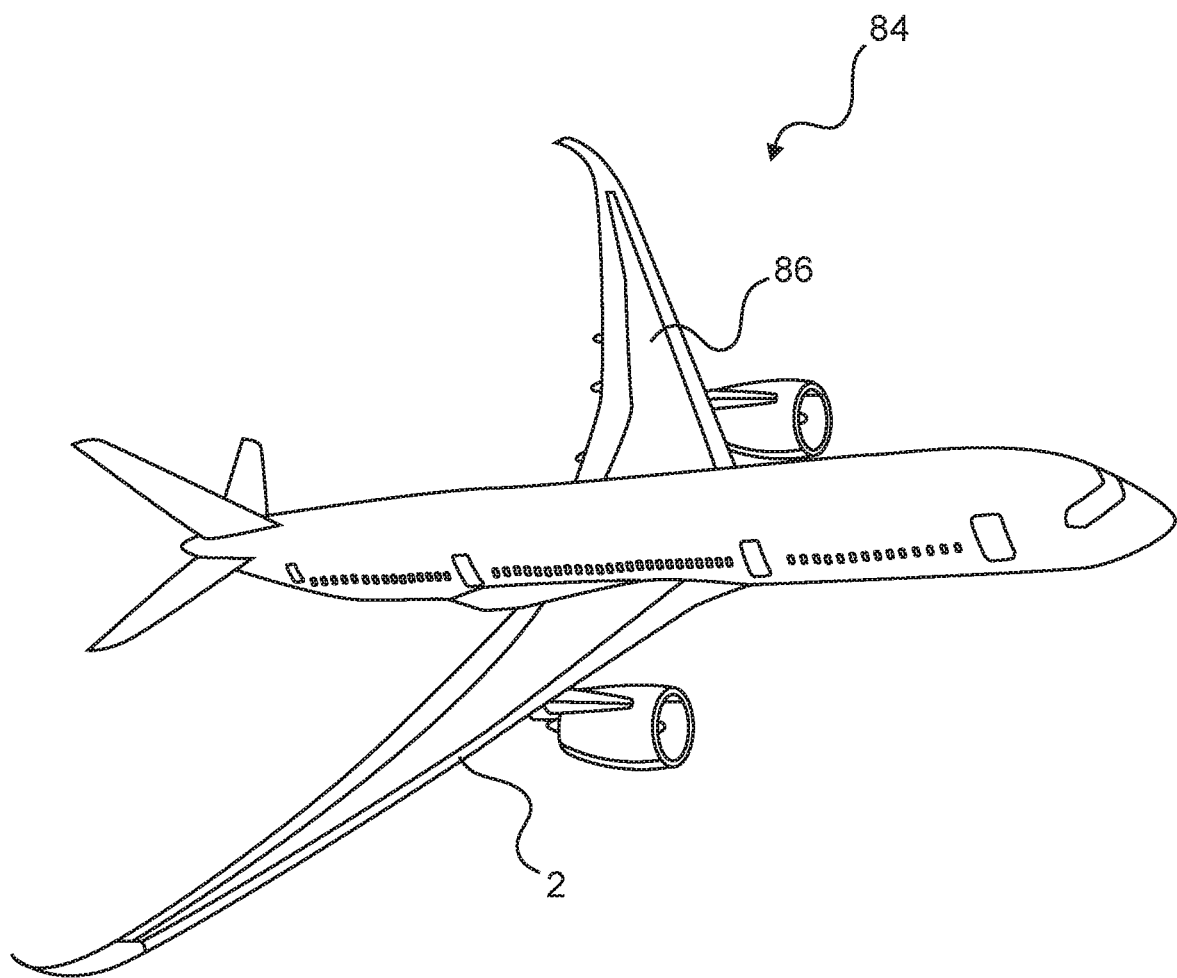
FIG. 9 shows an aircraft having wings with such wing leading edge devices.

Finally, FIG. 9 shows an aircraft 84 having wings 86 with wing leading edge devices 2. However, the leading-edge devices may also be realized in the form of all other exemplary embodiments shown in FIGS. 2 to 8.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 wing leading edge device
4 flow body
6 front side
8 first spanwise edge
10 second spanwise edge
12 front skin 14 back side
16 back skin
18 stiffening arrangement
20 honeycomb core
22 wing leading edge device
23 flow body
24 stiffening arrangement
26 spar
28 spar
30 spar
32 tip profile body
34 wing leading edge device
35 flow body
36 stiffening arrangement
38 spar
40 flexible tip
42 back skin
44 first step
46 end of back skin
48 wing leading edge device
49 flow body
50 stiffening arrangement
52 stiffening rib
54 hollow space
56 leading-edge device
57 flow body
58 stiffening arrangement
60 corrugated sheet
61 spanwise stiffening body
62 fold
64 wing leading edge device
65 flow body
66 corrugated sheet
68 fold
70 wing leading edge device
71 flow body
72 stiffening arrangement
74 tip profile body
76 back skin
78 tip
80 wing leading edge device
81 flow body
82 back skin
84 aircraft
86 wing

The invention claimed is:

1. A flow body for an aircraft, the flow body comprising:
a front side delimited by a first spanwise edge and a second spanwise edge;
a back side delimited by the first spanwise edge and the second spanwise edge;
a front skin arranged on the front side;
a back skin arranged on the back side; and
at least one stiffening arrangement from the front skin to the back skin in the region of the first spanwise edge, the at least one stiffening arrangement comprising a corrugated sheet material extending from the front skin to the back skin,
wherein the front skin extends continuously and free from interruptions between the first spanwise edge and the second spanwise edge and covers the at least one stiffening arrangement.

2. The flow body according to claim 1, wherein the at least one stiffening arrangement extends from the front skin to the back skin in the region of the first spanwise edge.

3. The flow body according to claim 1, wherein the at least one stiffening arrangement further comprises a tip profile body attached to the front skin neighboring the first spanwise edge at side of the front skin that faces the back skin for stiffening the flow body in the region of the first spanwise edge.

4. The flow body according to claim 1, wherein the back skin is joggled in a spanwise section adjacent to the first spanwise edge.

5. The flow body according to claim 1,
wherein the flow body is a leading-edge slat, and
wherein the first spanwise edge is a trailing edge of the slat.

6. A wing comprising a fixed wing body and a wing leading edge device comprising a flow body according to claim 1.

7. An aircraft comprising at least one flow body according to claim 1.

8. The aircraft of claim 7, wherein the at least one flow body is a part of a wing leading edge device arranged on a fixed wing body of a wing.

9. A flow body for an aircraft, the flow body comprising:
a front side delimited by a first spanwise edge and a second spanwise edge;
a back side delimited by the first spanwise edge and the second spanwise edge;
a front skin arranged on the front side;
a back skin arranged on the back side; and
at least one stiffening arrangement from the front skin to the back skin in the region of the first spanwise edge,
wherein the front skin extends continuously and free from interruptions between the first spanwise edge and the second spanwise edge and covers the at least one stiffening arrangement, and
wherein the at least one stiffening arrangement comprises a honeycomb core extending from the front skin to the back skin.

* * * * *